United States Patent [19]

Margetts et al.

[11] 4,234,061
[45] Nov. 18, 1980

[54] DISC BRAKES FOR VEHICLES

[75] Inventors: Hugh G. Margetts; Keith M. Rouse, both of Leamington Spa, England

[73] Assignee: Girling Limited, Birmingham, England

[21] Appl. No.: 966,370

[22] Filed: Dec. 4, 1978

[30] Foreign Application Priority Data

Dec. 2, 1977 [GB] United Kingdom ............... 50295/77

[51] Int. Cl.³ ............................................. F16D 55/04
[52] U.S. Cl. .................................. 188/71.3; 188/71.5; 188/72.4; 188/73.3
[58] Field of Search .................... 188/71.1, 71.5, 73.3, 188/73.4, 72.4, 71.3; 192/70.21, 70.4

[56] References Cited

U.S. PATENT DOCUMENTS

| | | | |
|---|---|---|---|
| 3,448,831 | 6/1969 | Newstead | 188/71.3 |
| 3,951,239 | 4/1976 | Newstead | 188/71.5 |
| 4,064,974 | 12/1977 | Filderman | 188/73.3 X |
| 4,121,696 | 10/1978 | Margetts | 188/71.3 |

*Primary Examiner*—George E. A. Halovsa
*Attorney, Agent, or Firm*—Scrivener, Parker, Scrivener and Clarke

[57] ABSTRACT

In a vehicle disc brake a pair of friction pad assemblies are adapted to be applied simultaneously to the respective inboard and outboard faces of each of a pair of relatively fixed, axially spaced, rotatable discs by an actuator assembly. The actuator assembly comprises a pair of first and second rigid clamp assemblies which are relatively movable axially, and an actuator acting between the two clamp assemblies. The clamp assembly is arranged to apply the friction pad assemblies to the inboard faces of the discs and the clamp assembly is arranged to apply the friction pad assemblies to the outboard faces of the discs.

8 Claims, 7 Drawing Figures

DISC BRAKES FOR VEHICLES

SPECIFIC DESCRIPTION

This invention relates to disc brakes for vehicles of the kind in which a pair of friction pad assemblies are adapted to be applied simultaneously to opposite faces of each of a pair of relatively fixed, axially spaced, rotatable discs, and actuating means are provided for applying the friction pad assemblies to the discs.

Known disc brake assemblies of the kind set forth incorporate fairly complicated actuating means for applying all four pad assemblies together to the discs.

In one known disc brake assembly of the kind set forth, as described in our U.S. Pat. No. 3,951,239, the actuating means comprises first and second fluid-pressure operated actuators disposed on a chordal plane common to both discs, and each actuator is embodied in a clamp assembly which extends over the peripheral edge of a respective disc and comprisescoupled beams, the actuator acting between one beam and a first friction pad assembly which engages with the adjacent face of that disc and the other beam acting on a second pad assembly which engages with the opposite face of that disc to apply a reacton from the actuator to the second pad assembly. In such a construction both actuators are disposed adjacent to the outer face of one of the discs.

In another known disc brake assembly of the kind set forth, as described in or U.S. Pat. No. 3,448,831, a first hydraulic actuator assembly is provided between the discs to apply the adjacent second and third pad assemblies to the adjacent inner faces of the discs and a second actuator assembly applies the first and fourth pad assemblies to the outer faces of the discs.

In an alternative known assembly of the kind set forth as described in our U.S. Pat. No. 4,121,696 a mechanical expander mechanism is housed between the discs to act directly on the pad assemblies for engagement with the adjacent inner faces.

The main problem arising in such brake assemblies is that of actuating all the pad assemblies in the limited space available so that substantially equal contact pressures are maintained and none of the braking surfaces is over-worked.

According to our invention is a disc brake assembly of the kind set forth the actuating means comprises a pair of first and second rigid clamp assemblies which are relatively movable axially, each clamp assembly being adapted to apply one pad assembly of each pair to each disc respectively, and an actuator acting between both clamp assemblies to urge the clamp assemblies in an axial direction relative to each other.

Since the pad assemblies are adapted to be moved together in pairs, the actuator can be as simple as an actuator for a conventional single fixed disc brake. It may, for example, comprise a fluid-pressure operated actuator assembly or a mechanical expander mechanism.

The disc separation will vary during working of the brake over a range of temperatures due to thermal expansions and contractions. Thus during a brake application the contact pressures between friction pad assemblies on the in-board face of the outboard disc the outboard face of the inboard disc will normally be different from the contact pressures between the remaining two friction pad assemblies and the outboard face of the outboard disc and the in-board face on the in-board disc. The discs will heat up during a normal brake application so that the outboard friction pad assembly of the outboard disc and the inboard friction pad assembly of the inboard disc are subject to a higher contact pressure and will tend to wear faster. If the brake is applied over a prolonged period the differential wear will eventually result in equalisation of the contact pressures. Then if the brake is subsequently applied at a lower working temperature the spacing between the discs will be less and the inboard friction pad assembly for the outboard disc and the outboard friction pad assembly for the inboard disc will wear faster until equalisation is again achieved. Over a prolonged period of use an average working temperature and disc separation will be established and the average wear of the friction pads will be equal. Thus any differential wear effect will be short-lived and not cumulative and the friction pad assemblies will wear out fairly evenly. The energy dissipated at the pad assemblies will be substantially equally distributed when the total energy dissipated is at the maximum for which the brake is designed.

Under emergency braking conditions, particularly if the brake is cold, the sudden intense application force will be applied mainly at the pad assemblies for the inboard face of the outboard disc and the outboard face of the inboard disc if the discs are at their minimum separation, and the contact pressures acting at the inner friction pads will therefore be very high. The parts of the brake assembly are arranged so that the force required to deflect, or cone, the discs axially is less than the maximum contact pressure under emergency braking conditions. Thus overworking and resultant crazing of the friction pads for the inboard face of the outboard disc and the outboard face of the inboard disc on emergency braking is prevented. Under these conditions the deflecting force acts to separate the discs until the contact pressures are equalised. The deflection may be allowed for by the inherent flexibility of the brake parts, particularly in the large brakes of heavy commercial vehicles in which brakes of the kind set forth are normally used. Alternatively an artificial deflection may be introduced, particularly in a motor car installation. It is not necessary for the parts to be flexible enough to allow similar deflection and equalisation under normal braking conditions with low application forces, as the differential wear is not cumulative under these conditions and overworking will not occur.

It follows that one of the clamp assemblies is adapted to apply the friction pad assemblies to the inboard faces of the discs, and the other clamp assembly is adapted to apply the remaining friction pad assemblies to the outboard faces of the discs.

When the brake is installed in a vehicle it is preferably for the actuator to be located on the inboard side of the inboard disc.

In one construction the first clamp assembly extends over the peripheral edge of the inboard disc and has arms which act on the friction pad assemblies for engagement with the inboard faces of the two discs and the second clamp assembly houses the actuator in an arm adjacent to the inboard arm of the first clamp assembly and extends over the peripheral edges of both discs with arms acting on the two friction pad assemblies for engagement with the outboard faces of the two discs.

In a preferred construction of brake the clamp assemblies comprise coupled pressure plates acting on the respective pad assemblies. The first clamp assembly may comprise a pair of pressure plates coupled by pins and acting on the respective inboard friction pad assemblies of the inboard and outboard discs, and the second clamp assembly may comprise a pair of pressure plates adjacent to the outboard pad assemblies and an actuating beam on the inboard side of the brake assembly in which the actuator is mounted, the pressure plates and beam being coupled together by draw-bars. Alternatively the pressure plates of both clamp assemblies may be coupled by pin and sleeve arrangements. This type of clamp assembly is particularly suitable for maintaining correct presentation of the pads for even distribution of the force applied, even when the discs deflect or "cone" under extreme braking conditions.

In either construction the pressure plates for applying the friction pad assemblies to the inboard face of the outboard disc and to the outboard face of the inboard disc may be interdigitated, in order to conserve space in an axial direction and ensure that these pressure plates are of adequate strength without having to increase the spacing between the two discs.

In either construction the pressure plates for applying the friction pads to the two embodiments of our invention will now be described by way of example with reference to the accompanying drawings, in which.

Figure 1:
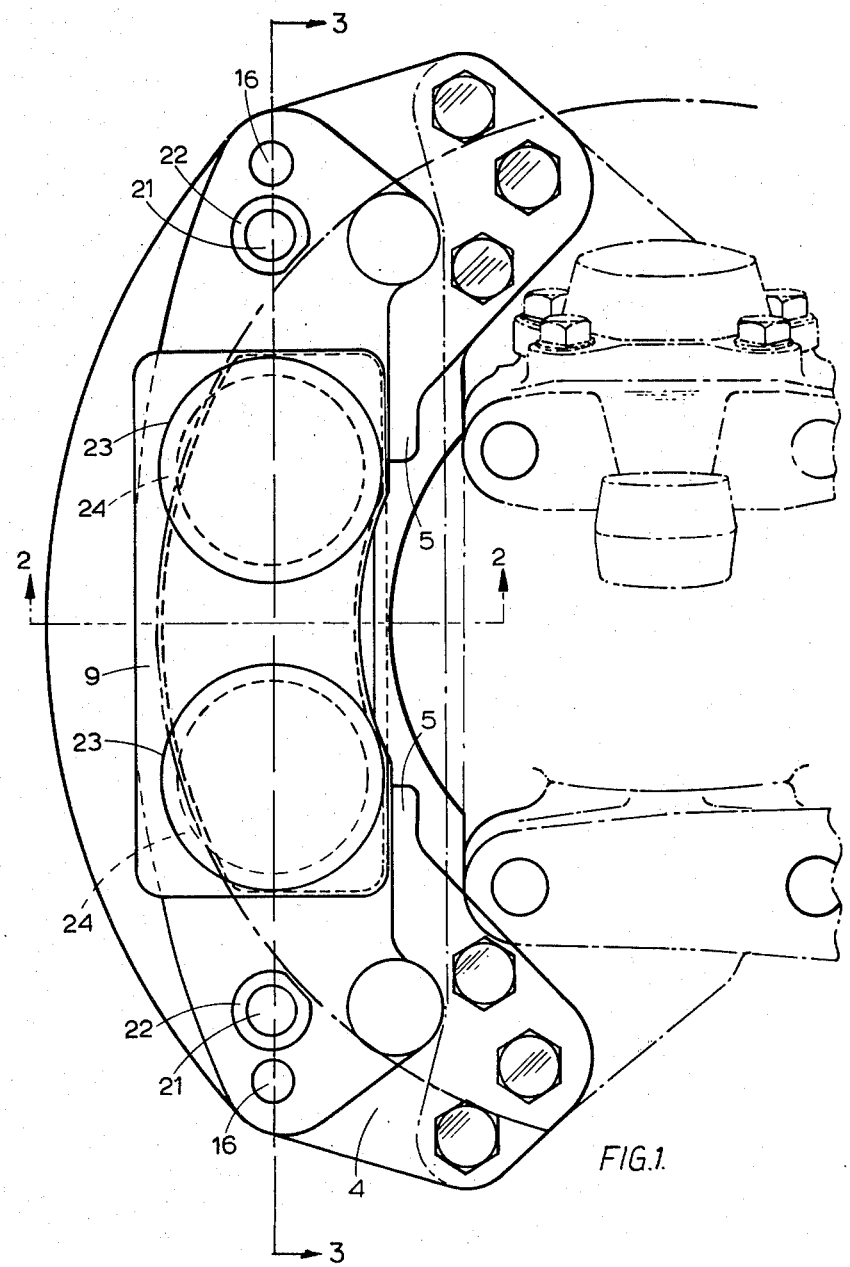
FIG. 1 is an end view of a disc brake assembly.

The disc brake assembly shown in FIGS. 1 to 4 comprises first and second axially fixed and relatively spaced inboard and outboard discs 1 and 2 which are rotatable on an axle 3 of a vehicle and have adjacent inner faces. The axle 3 forms a mounting for a stationary drag taking member 4 which has circumferentially spaced integral arms 5 straddling the discs, and the discs 1 and 2 are carried from a limb 6 which is rotatable on the axle 3 and which has a radial flange 7 on which a wheel 8 is mounted.

Opposed friction pad assemblies 9 and 10 for engagement with the opposite inboard and outboard faces of the inboard disc 1 and opposed friction pad assemblies 11 and 12 for engagement with the opposite inboard and outboard faces of the outboard disc 2, respectively, are located and guided in the stationary member between the arms 5 which take the drag on the pad assemblies 9, 10, 11 and 12 on brake application. Each pad assembly 9, 10, 11 and 12 comprises a pad of friction material carried by a rigid backing plate.

A first clamp assembly 13 straddles the periphery of the disc 1 and comprises pressure plates 14, 15 clamped together by two circumferentially spaced pins 16. The pressure plates 14 and 15 are arranged adjacent to the inboard pad assembly 9 of the inboard disc 1 and the inboard pad assembly 11 of the outboard disc 2 respectively. The pins 16 are floatingly supported in bores extending axially through the arms 5 of the stationary member 4.

A second clamp assembly 17 straddling the periphery of both discs 1, 2 comprises axially spaced pressure plates 18, 19 and an actuator beam 20, all of which are clamped together by circumferentially spaced draw-bars 21, with a spacing sleeve 22 mounted on each draw-bar 21 between the pressure plates 18, 19. The pressure plate 18 is arranged adjacent to the outboard pad assembly 10 of the inboard disc 1 and the pressure plate 19 is arranged adjacent to the outboard pad assembly 12 of the outboard disc 2. The actuator beam 20 is arranged adjacent to the pressure plate 14 of the first clamp assembly 13 and the draw bars 21 are floatably supported in bores extending axially in the arms 5.

The actuator beam 20 incorporates an actuator comprising a pair of hydraulic cylinders 23 and a pair of hydraulic pistons 24 which work in the cylinders 23. The pistons 24 are arranged to act on the pressure plate 14 of the first clamp assembly 13.

Figure 2:
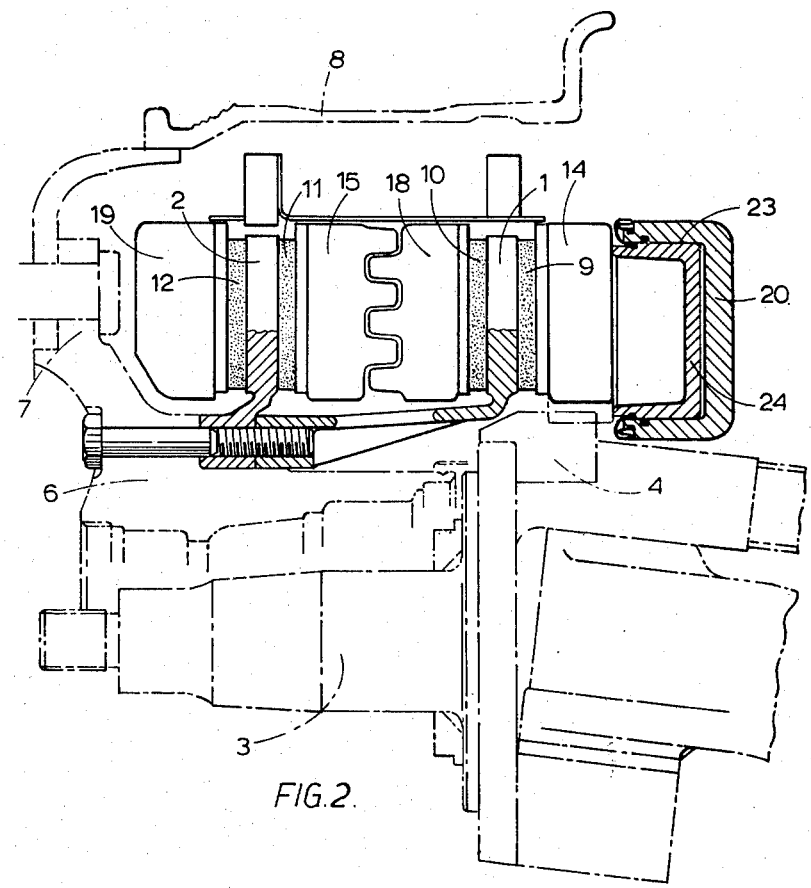
FIG. 2 is a section on the line 2—2 of FIG. 1.
Figure 3:
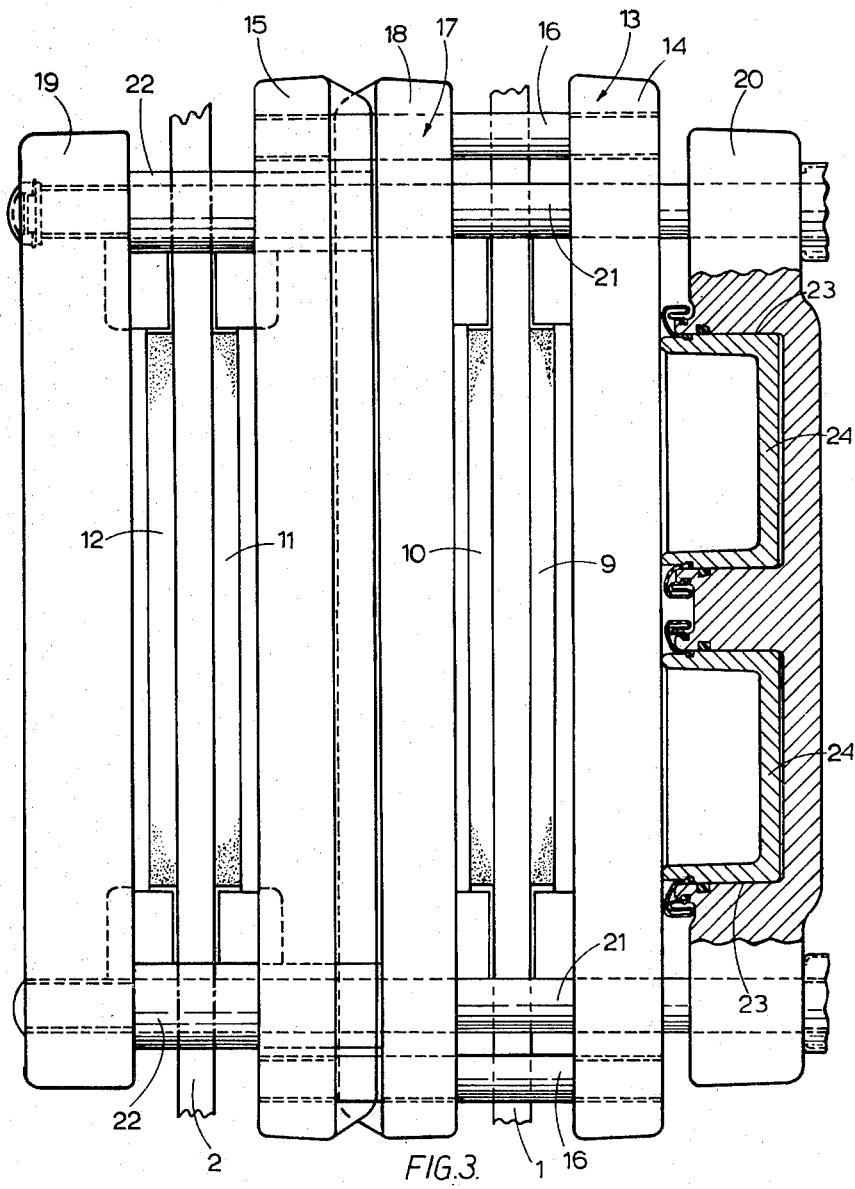
FIG. 3 is a section on the line 3—3 of FIG. 1.
Figure 4:
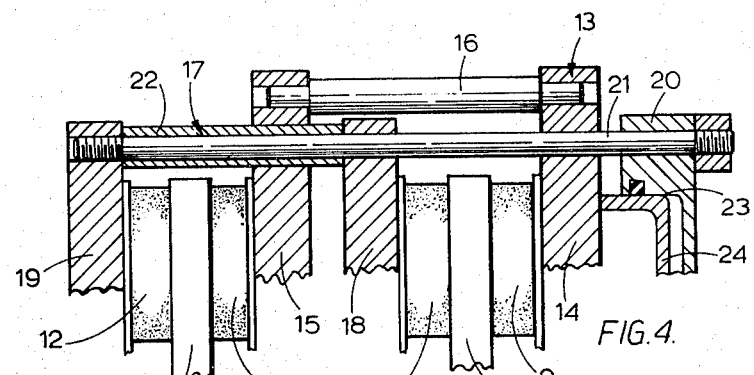
FIG. 4 is a diagrammatic view of part of FIG. 3.

As shown in FIG. 2 the two pressure plates 18, 15 positioned between the discs 1, 2 are interdigitated to provide each with the requisite strength in the small axial space available between the discs.

On a brake application hydraulic fluid is supplied to the hydraulic cylinders 23 and the pistons 24 are urged towards the pressure plate 14 thus urging the pressure plate 14 to the left to apply the adjacent friction pad assembly 9 to the inboard face of the inboard disc 1. At the same time the pressure plate 15 is also urged to the left through the pins 16 and the adjacent pad assembly 11 is applied to the inboard face of the outboard disc 2. Meanwhile the reaction on the actuator beam 20 urges the second clamp assembly 17 to the right so that the pressure plates 18, 19 apply both respective adjacent outboard pad assemblies 10, 12 to the respective outboard faces of the discs 1, 2 the pressure plate 19 acting on the pressure plate 18 through the spacing sleeves 22.

Figure 5:
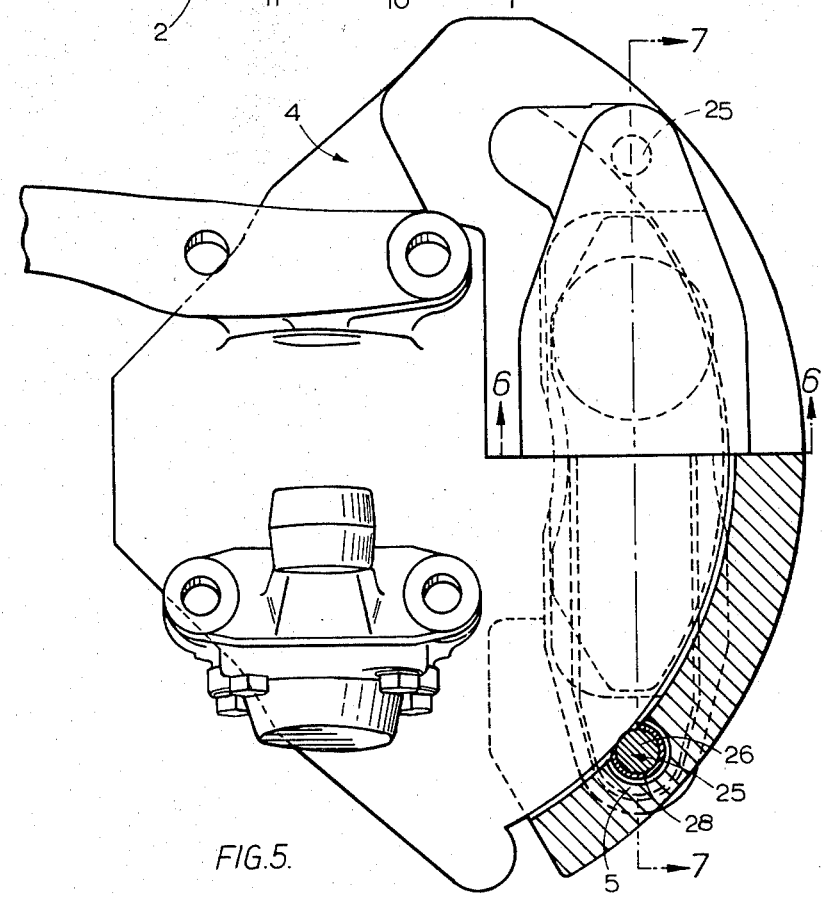
FIG. 5 is an end view, partly in section, of a modified disc brake assembly.
Figure 6:
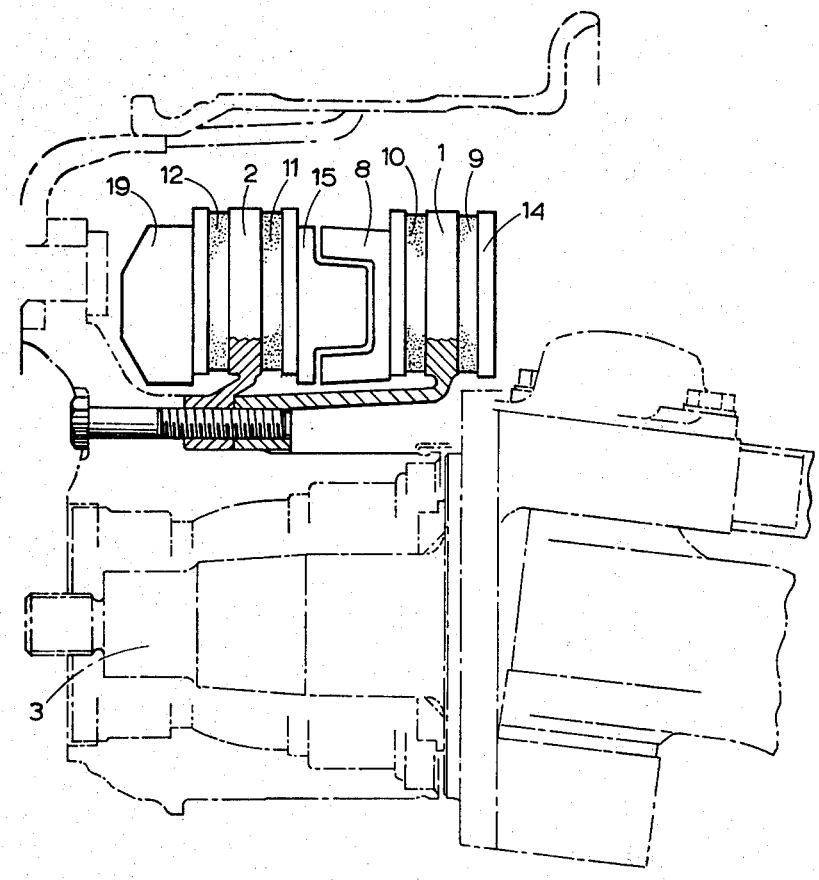
FIG. 6 is a section on the line 6—6 of FIG. 5.
Figure 7:
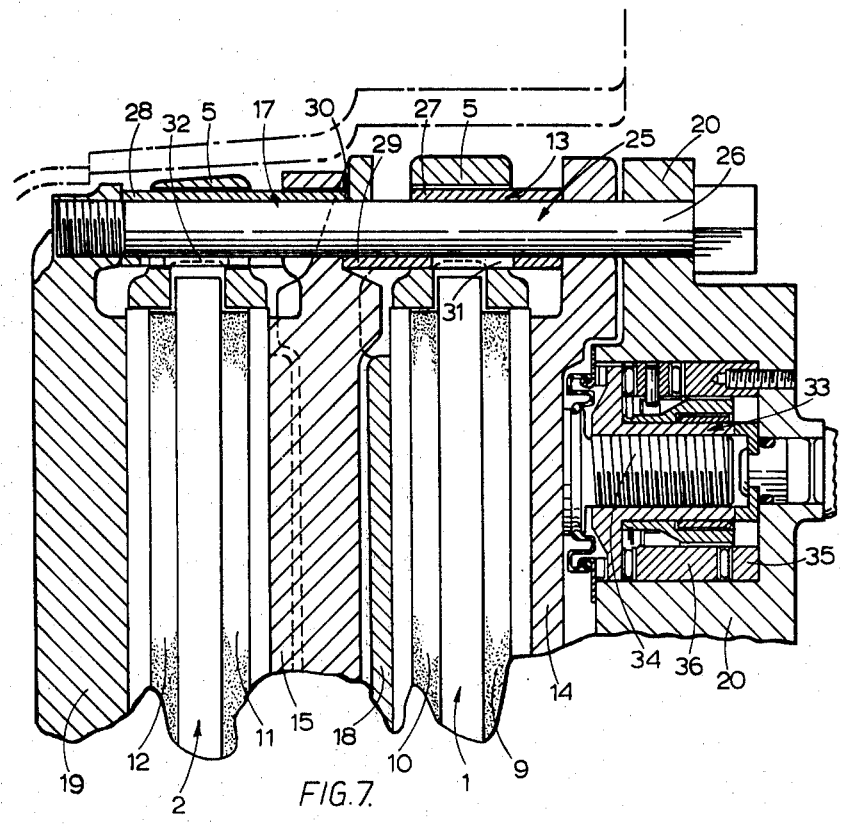
FIG. 7 is a section on the line 7—7 of FIG. 5.

In the modified brake assembly shown in FIGS. 5 to 7 the connecting pins 16, 21 are omitted and a pair of circumferentially spaced pin and sleeve assemblies 25 to act to connect the pressure plates 14, 15 and 18, 19 of the two clamp assemblies 13, 17. Each pin and sleeve assembly 25 comprises a main pin 26 which extends through the actuator beam 20 and through axially extending clearance bores in the pressure plates 14, 18, and 15 and the arms 5, and is connected to the pressure plate 19, as shown in FIG. 7. A first sleeve 27 is slidably mounted on the pin 26 and extends between the pressure plates 14 and 15 of the first clamp assembly 13. A second sleeve 28 is slidably mounted on the pin 26 and extends between the pressure plates 18, 19 of the second clamp assembly 17. The sleeves 27, 28 are formed with interdigitated finger portions 29, 30 at their inner adjacent ends so that they can overlap as shown in FIG. 7. Cut away portions 31, 32 in the parts of the sleeves 27, 28 adjacent to the discs 1, 2 allow the main pin 26 to be positioned as close as possible to the discs. This ensures that the maximum disc diameter can be provided for a given vehicle wheel size.

A mechanical expander mechanism 33 is housed in the actuator beam 20 as shown in FIG. 7 and comprises a thrust member 34 which acts on the pressure plate 14 and is movable, axially relatively away from a thrust member 35 which is keyed to and acts on the actuator beam 20, in response to rotation of an expander member 36.

The construction of the brake assembly is otherwise the same as that of FIGS. 1 to 4 and corresponding reference numerals have been applied to corresponding parts.

On brake application the thrust members 34, 35 of the expander mechanism 33 are urged relatively apart by the expander member 36 and the first thrust member 34 acts directly on the pressure plate 14 of the first clamp assembly 13 to apply the inboard friction pad assembly 9 to the inboard disc 1. Movement of the pressure plate 14 also urges the sleeve 27 and the other pressure plate 15 of the first clamp assembly 13 to the left to apply the adjacent other inboard friction pad assembly 11 to the inboard face of the outboard disc 2. At the same time the second thrust member 35 acts on the pressure plates 19, 18 of the second clamp 35 assembly 17 through the actuator beam 20, the pin 26 and the sleeve 28 to apply the adjacent outboard friction pad assemblies 12, 10 to the respective outboard faces of the discs 2, 1.

The discs have a degree of flexibility so that they deflect to achieve the effects described. This deflection takes the form of coning of the discs. The "presentation" of a pad to a disc to achieve even distribution of the clamp force over the pad can suffer when the discs cone. In U.S. Pat. No. 3,656,590 a caliper comprising floatingly supported beams and pins is described, and this type of caliper is particularly suited for use with the connected pad assemblies of the invention, due to its ability to maintain correct presentation of the pads even during coning.

Thus the invention uses only the simple push-pull of a normal single fixed disc brake actuation arrangement, but the expected disadvantages of using this struction are of the whole not present.

We claim:

1. A disc brake for vehicles comprising a first axially fixed rotatable disc having an inboard face and an outboard face, a second axially fixed rotatable disc spaced axially from said first disc and having an inboard face and an outboard face, one of said discs being mounted inboard of the other of said discs, a pair of friction pad assemblies for engagement with opposite faces of each of said discs, and actuating means for applying said friction pad assemblies to said discs, wherein said actuating means comprises first and second separate clamp assemblies, the elements of each assembly being rigidly joined together when actuated means for mounting each of said clamp assemblies for relative movement in opposite axial directions, each of said clamp assemblies being adapted to apply one pad assembly of each pair to each of said first disc and said second disc, and a single common actuator acting between both said clamp assemblies to urge said clamp assemblies in said opposite axial directions to apply all said friction pad assemblies to said discs.

2. A disc brake as claimed in claim 1, wherein one of said clamp assemblies is adapted to apply one of said friction pad assemblies of each of said pairs to said inboard faces of said discs, and the other of said clamp assemblies is adapted to apply the other of said friction pad assemblies of each of said pair to said outboard faces of said discs.

3. A disc brake as claimed in claim 1 wherein said clamp assemblies comprise coupled pressure plates acting on said respective pad assemblies.

4. A disc brake for vehicles comprising a first axially fixed rotatable disc having an inboard face and an outboard face, a second axially fixed rotatable disc spaced axially from said first disc and having an inboard face and an outboard face, one of said discs being mounted inboard of the other of said discs, a pair of friction pad assemblies for engagement with opposite faces of each of said discs, and actuating means for applying said friction pad assemblies to said discs, wherein said actuating means comprises first and second rigid clamp assemblies, means for mounting said clamp assemblies for relative movement in an axial direction, each of said clamp assemblies being adapted to apply one pad assembly of each pair to each of said first disc and said second disc, and a single common actuator acting between both said clamp assemblies in an axial direction with respect to each other to apply all said friction pad assemblies to said discs, wherein said first clamp assembly extends over the peripheral edge of said inboard disc and has first and second arms which acts on the said friction pad assemblies for engagement with said inboard faces of said two discs, and said second clamp assembly has an actuator arm adjacent to one of said arms of said first clamp assembly and said actuator is housed in the said actuator arm, said second clamp assembly extending over the peripheral edges of both said discs with third and fourth arms acting on the said friction pad assemblies for engagement with the said outboard faces of said discs.

5. A disc brake for vehicles comprising a first axially fixed rotatable disc having an inboard face and an outboard face, a second axially fixed rotatable disc spaced axially from said first disc and having an inboard face and an outboard face, one of said discs being mounted inboard of the other of said discs, a pair of friction pad assemblies for engagement with opposite faces of each of said discs, and actuating means for applying said friction pad assemblies to said discs, wherein said actuating means comprises first and second rigid clamp assemblies, means for mounting said clamp assemblies for relative movement in an axial direction, each of said clamp assemblies being adapted to apply one pad assembly of each pair to each of said first disc and said second disc, and a single common actuator acting between both said clamp assemblies to urge said clamp assemblies in an axial direction with respect to each other to apply all said friction pad assemblies to said discs, said first clamp assembly comprises a pair of coupled pressure plates which act on the said friction pad assemblies for engagement with said inboard faces of said inboard and outboard discs, and said second clamp assembly comprises a pair of pressure plates adjacent to said pad assemblies for engagement with said outboard faces of said discs, and an actuting beam on the inboard side of said brake in which said actuator is mounted, and means are provided for coupling said pressure plates and said beam of said second clamp assembly together.

6. A disc brake as claimed in claim 5, wherein pins couple said pressure plates of said first clamp assembly, and draw-bars couple together said pressure plates and said beam of said second clamp assembly.

7. A disc brake as claimed in claim 5, wherein pin and sleeve arrangements couple said pressure plates of both clamp assemblies.

8. A disc brake as claimed in claim 5, wherein said pressure plates for applying said friction pad assemblies to said inboard face of said outboard disc and to said outboard face of said inboard disc are interdigitated.

* * * * *